US010542266B2

United States Patent
Samy

(10) Patent No.: US 10,542,266 B2
(45) Date of Patent: Jan. 21, 2020

(54) METHOD AND DEVICE FOR TRANSCODING VIDEO DATA FROM H.264 TO H.265

(71) Applicant: SAGEMCOM BROADBAND SAS, Rueil Malmaison (FR)

(72) Inventor: Roger Samy, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 208 days.

(21) Appl. No.: 15/111,630

(22) PCT Filed: Jan. 14, 2015

(86) PCT No.: PCT/EP2015/050584
§ 371 (c)(1),
(2) Date: Jul. 14, 2016

(87) PCT Pub. No.: WO2015/107077
PCT Pub. Date: Jul. 23, 2015

(65) Prior Publication Data
US 2016/0353121 A1     Dec. 1, 2016

(30) Foreign Application Priority Data
Jan. 17, 2014    (FR) ..................... 14 50367

(51) Int. Cl.
*H04N 19/40*     (2014.01)
*H04N 19/517*     (2014.01)
(Continued)

(52) U.S. Cl.
CPC ............. *H04N 19/40* (2014.11); *H04N 19/48* (2014.11); *H04N 19/513* (2014.11); *H04N 19/517* (2014.11); *H04N 19/91* (2014.11)

(58) Field of Classification Search
None
See application file for complete search history.

(56) References Cited

U.S. PATENT DOCUMENTS 5,031,038 A * 7/1991 Guillemot ............. G06F 17/147
375/240.2
5,982,436 A * 11/1999 Balakrishnan ....... H04N 19/577
348/409

(Continued)

FOREIGN PATENT DOCUMENTS

EP    2 579 596     4/2013

OTHER PUBLICATIONS

Ahmad et al. "Video Transcoding: An Overview of Various Techniques and Research Issues" IEEE vol. 7 No. 5 2005.*

(Continued)

*Primary Examiner* — Jayanti K Patel
*Assistant Examiner* — Stefan Gadomski
(74) *Attorney, Agent, or Firm* — Nixon & Vanderhye, P.C.

(57) ABSTRACT

A device for transcoding a video data stream in the H.264 format into a video data stream in the H.265 format includes circuitry adapted for performing a merging of adjacent macroblocks of the data stream in the H.264 format according to a predetermined criterion of frequency similarity of the discrete cosine transform coefficients of said macroblocks after application of an inverse quantisation operation; and for determining motion vectors in the H.265 format on the basis of motion vectors in the H.264 format by performing, for the macroblocks resulting from the merging of macroblocks issuing from the data stream in the H.264 format, a combination of the motion vectors of said macroblocks issuing from the data stream in the H.264 format.

16 Claims, 3 Drawing Sheets

Figure 1:
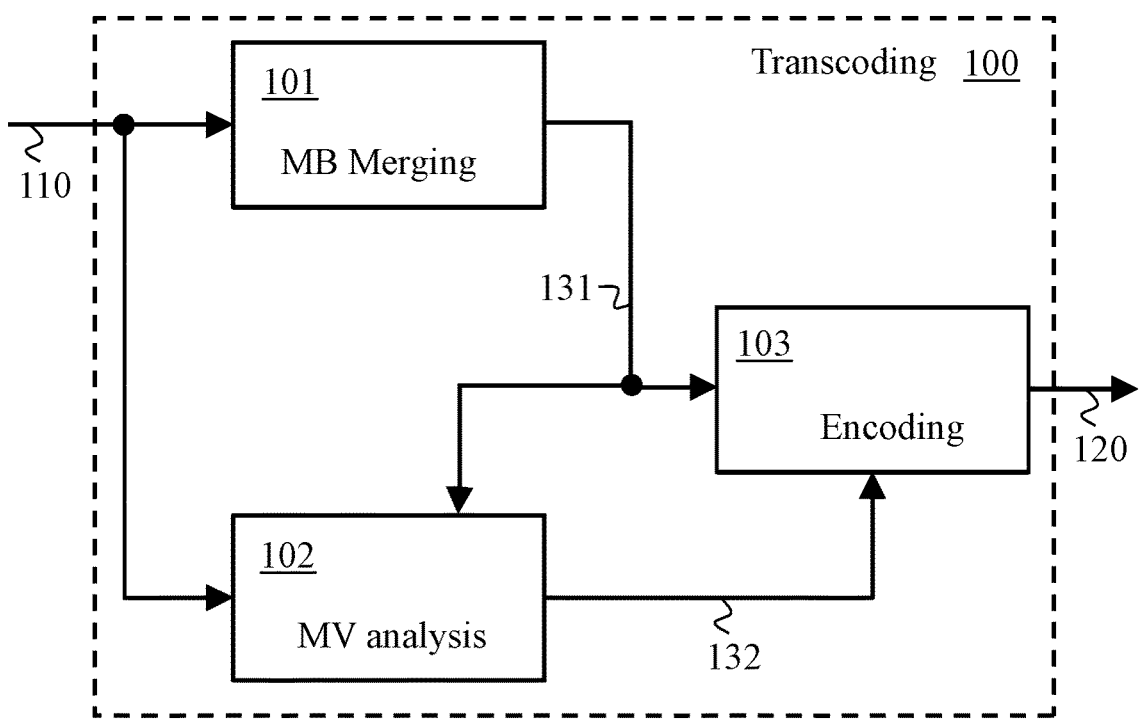

(51) Int. Cl.
*H04N 19/91* (2014.01)
*H04N 19/513* (2014.01)
*H04N 19/48* (2014.01)

(56) References Cited

U.S. PATENT DOCUMENTS

| | | | | |
|---|---|---|---|---|
| 6,385,242 | B1* | 5/2002 | Chen | H04N 19/61 375/240.03 |
| 6,526,099 | B1* | 2/2003 | Christopoulos | H04N 19/48 375/240.16 |
| 6,647,061 | B1* | 11/2003 | Panusopone | H04N 21/234309 375/240.12 |
| 6,834,080 | B1* | 12/2004 | Furukawa | H04N 19/139 348/699 |
| 6,999,512 | B2* | 2/2006 | Yoo | H04N 19/70 375/240.03 |
| 7,236,529 | B2* | 6/2007 | Lin | H04N 19/176 375/240.2 |
| 7,437,394 | B2* | 10/2008 | Hou | G06F 17/147 708/402 |
| 7,672,377 | B2* | 3/2010 | Heng | H04N 19/513 375/240.16 |
| 8,238,433 | B2* | 8/2012 | MacIel De Faria | H04N 19/56 375/240.15 |
| 2001/0047517 | A1* | 11/2001 | Christopoulos | G06T 1/00 725/87 |
| 2002/0051494 | A1* | 5/2002 | Yamaguchi | H04N 19/51 375/240.16 |
| 2002/0126752 | A1* | 9/2002 | Kim | H04N 19/40 375/240.03 |
| 2002/0163967 | A1* | 11/2002 | Youn | H04N 19/176 375/240.12 |
| 2003/0016751 | A1* | 1/2003 | Vetro | G06T 3/4084 375/240.16 |
| 2003/0026478 | A1* | 2/2003 | Jones | H04N 19/60 382/170 |
| 2003/0081676 | A1* | 5/2003 | Lin | H04N 19/176 375/240.12 |
| 2003/0090591 | A1* | 5/2003 | Concion | H04N 19/40 348/571 |
| 2003/0215011 | A1* | 11/2003 | Wang | H04N 19/176 375/240.03 |
| 2003/0236808 | A1* | 12/2003 | Hou | G06F 17/147 708/400 |
| 2005/0058204 | A1* | 3/2005 | Fernandes | H04N 19/40 375/240.16 |
| 2005/0089099 | A1* | 4/2005 | Lee | H04N 19/56 375/240.16 |
| 2005/0207488 | A1* | 9/2005 | Ouyang | G06F 17/147 375/240.2 |
| 2005/0232497 | A1* | 10/2005 | Yogeshwar | H04N 19/56 382/232 |
| 2006/0039473 | A1* | 2/2006 | Filippini | H04N 19/56 375/240.16 |
| 2006/0104359 | A1* | 5/2006 | Zhou | H04N 5/145 375/240.16 |
| 2006/0109900 | A1* | 5/2006 | Shen | H04N 19/176 375/240.03 |
| 2007/0058718 | A1* | 3/2007 | Shen | H04N 21/23608 375/240.12 |
| 2007/0071096 | A1* | 3/2007 | Chen | H04N 19/159 375/240.12 |
| 2007/0230568 | A1* | 10/2007 | Eleftheriadis | H04N 19/46 375/240.1 |
| 2008/0031337 | A1* | 2/2008 | Hasegawa | H04N 19/176 375/240.16 |
| 2008/0043831 | A1* | 2/2008 | Sethuraman | G10L 19/173 375/240 |
| 2008/0126812 | A1* | 5/2008 | Ahmed | H04N 19/61 713/189 |
| 2008/0151995 | A1* | 6/2008 | Youn | H04N 19/176 375/240.2 |
| 2009/0207918 | A1* | 8/2009 | Fan | H04N 21/440218 375/240.23 |
| 2011/0002381 | A1* | 1/2011 | Yang | H04N 19/172 375/240.03 |
| 2011/0090960 | A1* | 4/2011 | Leontaris | H04N 19/103 375/240.12 |
| 2011/0170597 | A1 | 7/2011 | Shi et al. | |
| 2011/0182343 | A1* | 7/2011 | Saito | H04N 19/61 375/224 |
| 2011/0268185 | A1* | 11/2011 | Watanabe | H04N 21/2343 375/240.03 |
| 2012/0155533 | A1* | 6/2012 | Puri | H04N 19/176 375/240.02 |
| 2012/0257672 | A1* | 10/2012 | Yang | H04N 19/126 375/240.03 |
| 2012/0300834 | A1* | 11/2012 | Metoevi | H04N 19/139 375/240.02 |
| 2013/0129326 | A1* | 5/2013 | Wang | H04N 19/00 386/355 |
| 2014/0133554 | A1* | 5/2014 | Bryant | H04N 19/543 375/240.12 |
| 2015/0092857 | A1* | 4/2015 | Chen | H04N 19/51 375/240.16 |
| 2015/0189306 | A1* | 7/2015 | Li | H04N 19/136 375/240.16 |
| 2015/0312575 | A1* | 10/2015 | Bryant | H04N 19/115 375/240.08 |
| 2016/0007050 | A1* | 1/2016 | Rusert | H04N 19/56 375/240.08 |
| 2016/0073126 | A1* | 3/2016 | Zhang | H04N 19/51 375/240.16 |
| 2016/0301941 | A1* | 10/2016 | Chono | H04N 19/194 |
| 2018/0302634 | A1* | 10/2018 | Bryant | H04N 19/115 |

OTHER PUBLICATIONS

Jing et al. "An Efficient Inter Mode Decision Approach for H.264 Video Coding" IEEE 2004.*

Lin et al. "Fast Algorithms for DCT-Domain Video Transcoding" IEEE 2001.*

Peixoto et al. "A Complexity-Scalable Transcoder From H.264/AVC to the New HEVC Codec" IEEE 2012.*

Shen et al. Fast H.264/MPEG-4 AVC Transcoding Using Power-Spectrum Based-Distortion Optimization IEEE 2008.*

Shen et al. "Ultra FastH.264/AVC to HEVC Transcoder" IEEE 2013.*

Youn et al. "Motion Vector Refinement for High-Performance Transcoding" IEEE vol. 1 No. 1 Mar. 1999.*

Zhang J., Dai F., Zhang Y., Yan C. (2013) Efficient HEVC to H.264/AVC Transcoding with Fast Intra Mode Decision. In: Li S. et al. (eds) Advances in Multimedia Modeling. MMM 2013. Lecture Notes in Computer Science, vol. 7732. Springer, Berlin, Heidelberg.*

Mehta et al. "A Primer to Video Transcoding: Image Transcoding", Indian Institute of Technology (Year: 2002).*

Fung et al. "DCT-Based Video Downscaling Transcoder Using Split and Merge Technique" IEEE Transactions of Image Processing (Year: 2006).*

Shiu et al. "A DCT-Domain H.263 Based Video Combiner for Multipoint Continuous Presence Video Conferencing", National Taiwan University (Year: 1999).*

Shanableh et al. "Hybrid DCT/pixel domain architecture for heterogenous video transcoding", Signal Processing: Image Communication (Year: 2003).*

Z. He and M. Bystrom, "Improved Conversion From DCT Blocks to Integer Cosine Transform Blocks in H.264/AVC," in IEEE Transactions on Circuits and Systems for Video Technology, vol. 18, No. 6, pp. 851-857, Jun. (Year: 2008).*

A. Buchowicz, "Transform Domain Transcoding of MPEG-2 Video to MPEG-4 AVC/H.264," EUROCON 2007—The International Conference on "Computer as a Tool", Warsaw, pp. 170-174. (Year: 2007).*

International Search Report and Written Opinion of the ISA for PCT/EP2015/050584, dated Mar. 23, 2015, 11 pages.

(56) References Cited

OTHER PUBLICATIONS

Zhang et al., "Fast Transcoding from H.264 AVC to High Efficiency Video Coding", Multimedia and Expo (ICME), 2012 IEEE International Conference, Jul. 9, 2012, pp. 651-656.
Helle et al., "Block Merging for Quadtree-Based Partitioning in HEVC" IEEE Transactions on Circuits and Systems for Video Technology, vol. 22, No. 12, Dec. 1, 2012, pp. 1720-1731.
Peiyin et al., "A Coding Unit Classification Based AVC-to-HEVC Transcoding with Background modeling for Surveillance Videos", 2013 Visual Communications and Image Processing, IEEE, Nov. 17, 2013, pp. 1-6.
Zhao et al., "Fast Mode Decision Algorithm for Intra Prediction in HEVC" Visual Communications and Image Processing (VCIP), 2011 IEEE, Nov. 6, 2011, pp. 1-4.

\* cited by examiner

METHOD AND DEVICE FOR TRANSCODING VIDEO DATA FROM H.264 TO H.265

This application is the U.S. national phase of International Application No. PCT/EP2015/050584 filed 14 Jan. 2015 which designated the U.S. and claims priority to FR Patent Application No. 14/50367 filed 17 Jan. 2014, the entire contents of each of which are hereby incorporated by reference.

The present invention relates to transcoding a video data stream to the H.264 format into a video data stream to the H.265 format.

The H.265 video data coding standard, which is also found under the reference HEVC (High Efficiency Video Coding), was developed to succeed the H.264 video coding standard, which is also found under the reference MPEG-4 AVC (Advanced Video Coding) or MPEG-4 Part 10. The H.265 video data coding standard enables obtaining, at equivalent quality, a better compression rate, which enables transporting very high definition (2K1K, 4K2K, 8K4K, etc.) video data streams on existing communication network infrastructures. From another point of view, the H.265 video data coding standard enables significantly reducing the transmission rate necessary for transporting high-definition or standard-definition video data streams over these existing communication network infrastructures. From yet another point of view, the H.265 video data coding standard enables reducing the power necessary for transporting the video data streams over communication network infrastructures.

Many items of equipment and infrastructures are at the present time suitable for supporting the encoding of video data streams to the H.264 standard, whereas the equipment in accordance with the H.265 standard is in emergence phase. So as to benefit from advances in terms of performance afforded by the H.265 standard compared with the H.264 standard without having to renew all said items of equipment and infrastructures, it is possible to apply a mechanism of transcoding a video data stream to the H.264 format into a video data stream to the H.265 format. However, completely decoding the video data stream to the H.264 format for completely re-encoding it as a video data stream to the H.265 format is costly in terms of processing resources and in terms of processing latency.

It is desirable to overcome these drawbacks of the prior art. It is in particular desirable to provide a solution that enables reducing the quantity of processing resources necessary for transcoding a video data stream to the H.264 standard into a video data stream to the H.265 standard. It is also desirable to provide a solution that enables reducing the processing latency necessary for performing such transcoding.

The invention relates to a transcoding method for transcoding a video data stream to the H.264 format into a video data stream to the H.265 format, said method being implemented by a transcoding device. The method is such that it comprises the following steps: performing a merging of adjacent macroblocks in the data stream to the H.264 format in accordance with a predetermined criterion of frequency similarity of the discrete cosine transform (DCT) coefficients of said macroblocks after application of an inverse quantisation operation; and determining motion vectors to the H.265 format on the basis of motion vectors to the H.264 format by performing, for the macroblocks resulting from the merging of macroblocks issuing from the data stream to the H.264 format, a combination of the motion vectors of said macroblocks issuing from the data stream to the H.264 format. Since the H.264 stream does not undergo complete decoding, the transcoding to a data stream to the H.265 format is advantageous in terms of processing resources and in terms of processing latency.

According to a particular embodiment, when the merged macroblocks correspond to predicted data in intra mode, the transcoding device associates with the resulting macroblock a prediction direction that is the prediction direction closest according to the H.264 format to a linear combination of the prediction directions associated with the merged macroblocks.

According to a particular embodiment, for determining whether adjacent macroblocks can be merged, the transcoding device obtains information on the sum of the absolute differences between DCT coefficients, after inverse quantisation, of said adjacent macroblocks, and compares said information on the sum of the absolute differences with a first predefined threshold.

According to a particular embodiment, for merging four adjacent macroblocks so as to form a resulting square macroblock, the transcoding device uses: a first butterfly diagram along the vertical dimension of the macroblocks, thus enabling generating a first intermediate macroblock from two macroblocks in the four adjacent macroblocks; a second butterfly diagram along the vertical dimension of the macroblocks thus enabling generating a second intermediate macroblock from the other two macroblocks in the four adjacent macroblocks; and a third butterfly diagram along the horizontal dimension of the macroblocks, thus enabling generating the resultant square macroblock.

According to a particular embodiment, for macroblocks encoded in inter mode to be merged, the transcoding device determines a difference between motion vectors associated with said macroblocks, and enables or not merging said macroblocks according to a criterion of similarity of said motion vectors.

According to a particular embodiment, for determining whether motion vectors are similar, the transcoding device determines the norm of the difference of the components of said motion vectors and compares said norm with a second predefined threshold.

According to a particular embodiment, the transcoding device determines each motion vector MV to the H.265 format resulting from a merging of macroblocks encoded in inter mode thanks to the following equation:

$$MV = \frac{(\alpha 1 \cdot MV1 + \alpha 2 \cdot MV2 + \ldots \alpha n \cdot MVn)}{(\alpha 1 + \alpha 2 \ldots + \alpha n)}$$

where:
n designates the quantity of merged macroblocks;
MV1, . . . , MVn represents the n motion vectors of the macroblocks encoded in inter mode that were merged together; and
α1, . . . , αn are weighting coefficients.

According to a particular embodiment, the transcoding device merges a plurality of sequences of successive pictures to the H.264 format in a single sequence of pictures, when the energies of the predicted pictures in said sequences of successive pictures are below a third predefined threshold.

The invention also relates to a transcoding device for transcoding a video data stream to the H.264 format into a video data stream to the H.265 format. The transcoding device is such that it comprises: means for performing a merging of adjacent macroblocks of the data stream to the H.264 format according to a predetermined criterion of frequency similarity of the discrete cosine transform DCT coefficients of said macroblocks after application of an inverse quantisation operation; and means for determining motion vectors to the H.265 format on the basis of motion vectors to the H.264 format by performing, for the macroblocks resulting from the merging of macroblocks issuing from the data stream to the H.264 format, a combination of the motion vectors of said macroblocks issuing from the data stream to the H.264 format.

The invention also relates to a computer program that can be stored on a medium and/or downloaded from a communication network in order to be read by a processor. This computer program comprises instructions for implementing any one of the methods mentioned above when said program is executed by the processor. The invention also relates to storage means comprising such a computer program.

Figure 2:
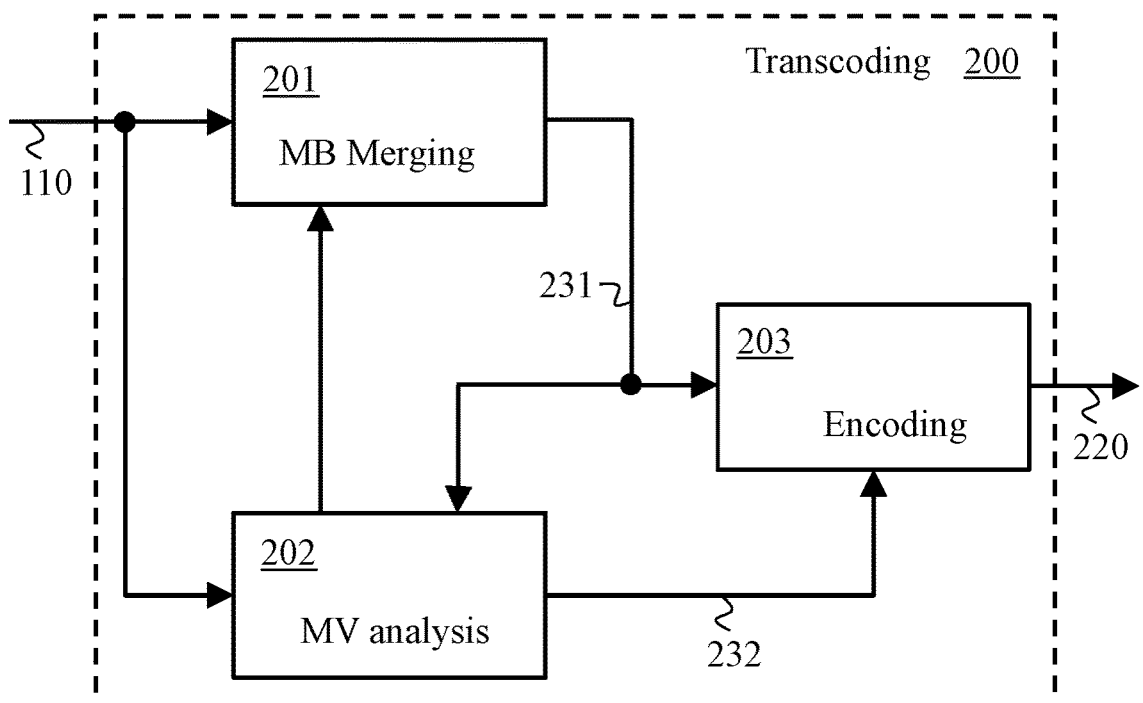
Figure 3:
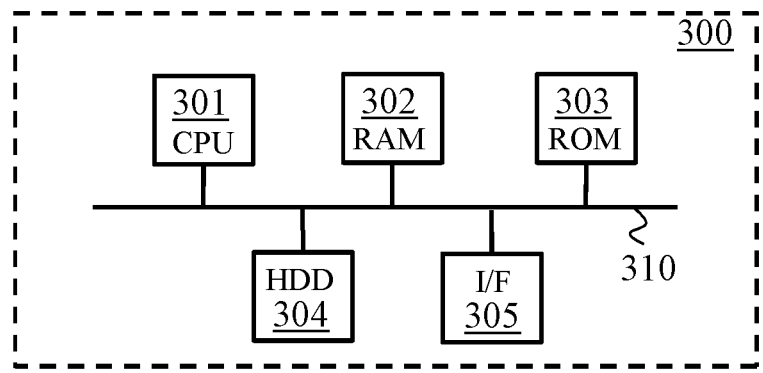
Figure 4:
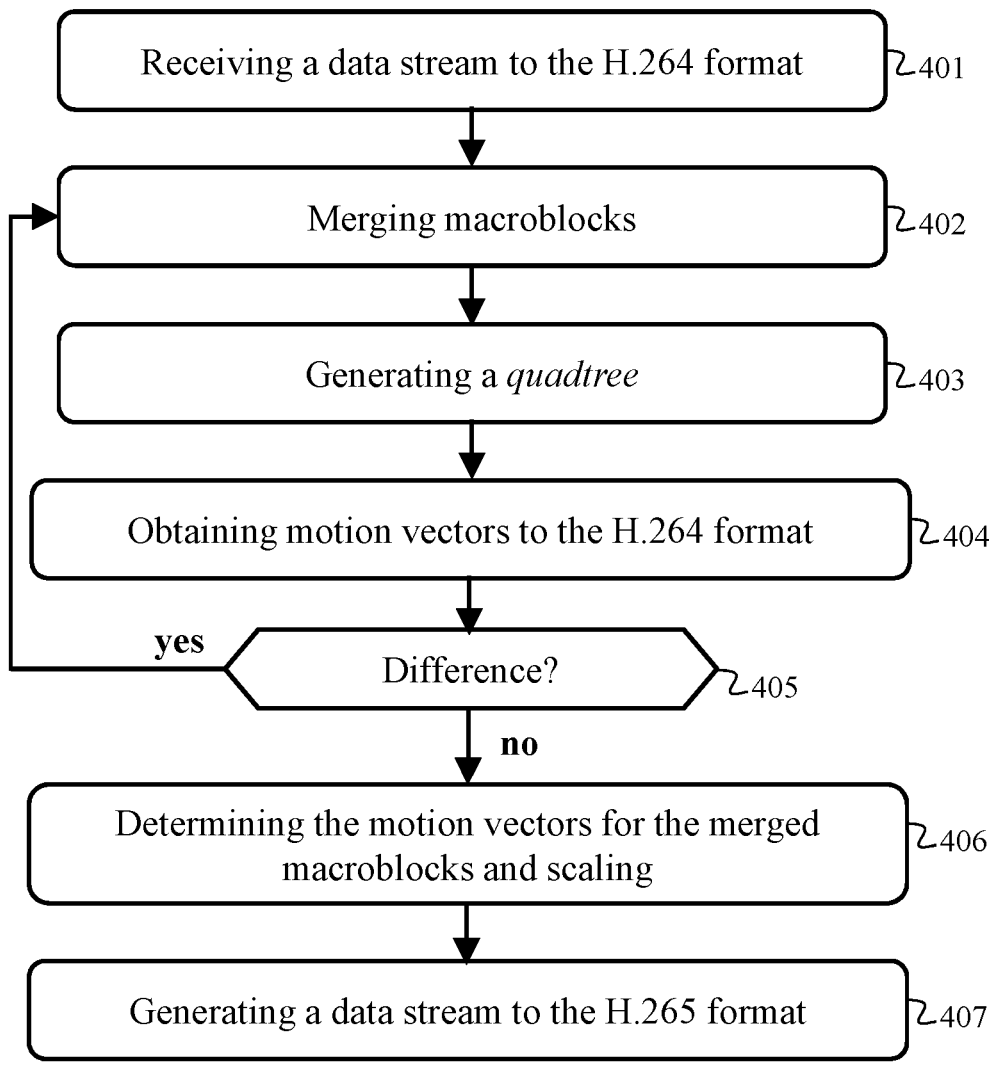
Figure 5:
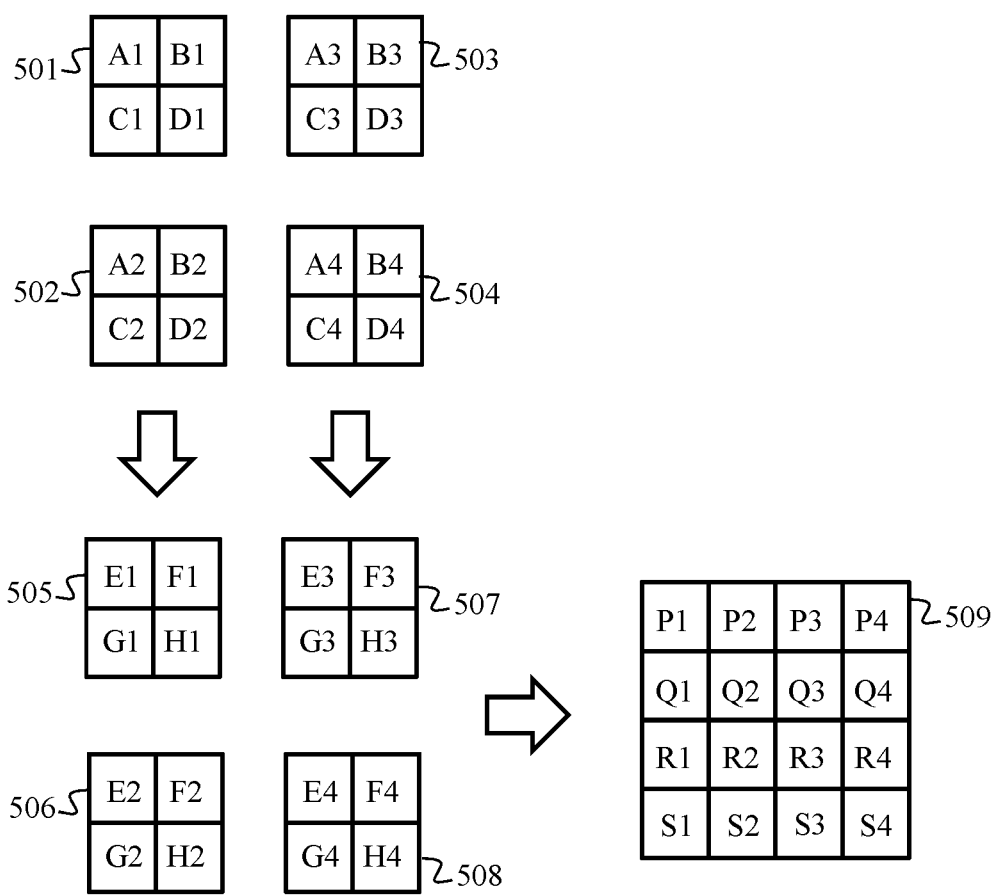

The features of the invention mentioned above, as well as others, will emerge more clearly from a reading of the following description of an example embodiment, said description being given in relation to the accompanying drawings, among which:

FIG. 1 schematically illustrates a first example of a video data transcoding device according to the present invention;

FIG. 2 schematically illustrates a second example of a video data transcoding device according to the present invention;

FIG. 3 schematically illustrates an example of hardware architecture of a video data transcoding device according to the present invention;

FIG. 4 schematically illustrates a transcoding algorithm used by a video data transcoding device according to the present invention; and FIG. 5 schematically illustrates an example of a merging of four macroblocks of a video data stream to the H.264 format so as to form a macroblock of a video data stream to the H.265 format.

In order to avoid completely decoding a data stream to the H.264 format for transcoding it as a data stream to the H.265 format, it is proposed, for intra-picture coding, to merge adjacent macroblocks of the data stream to the H.264 format according to a predetermined criterion of frequency similarity of the discrete cosine transform DCT coefficients of said macroblocks after application of an inverse quantisation operation. It is also proposed, for an inter-picture coding, to determine the motion vectors to the H.265 format on the basis of motion vectors to the H.264 format by performing, for the macroblocks resulting from a merging of the macroblocks issuing from the data stream to the H.264 format, a combination of the motion vectors of said macroblocks issuing from the data stream to the H.264 format. Other advantageous arrangements will emerge from a reading of the following embodiments.

It should be noted that the term macroblock used in the context of the H.264 format corresponds to the expression coding tree unit (CTU) in the context of the H.265 format.

FIG. 1 schematically illustrates a first example 100 of a video data transcoding device according to the present invention.

The transcoding device 100 is adapted for receiving a video data stream 110 to the H.264 format.

The transcoding device 100 comprises a macroblock merging module 101 and said transcoding device 100 is adapted for injecting the video data stream 110 into said macroblock merging module 101. The H.264 format is based on a partitioning by macroblocks of size 4×4 pixels and/or 8×8 pixels and/or 16×16 pixels. The macroblock merging module 101 is adapted for merging adjacent macroblocks according to a predetermined criterion of frequency similarity of the DCT coefficients of said macroblocks after application of an inverse quantisation operation, so as to form a data structure referred to as a quadtree. This merging operation can be applied both for macroblocks encoded in intra mode and for macroblocks encoded in inter mode. A quadtree is a data structure representing a two-dimensional space partitioning by recursively dividing said space into four quadrants.

The transcoding device 100 further comprises a motion vector analysis module 102 and said transcoding device 100 is adapted for injecting, into said motion vector analysis module 102, metadata present in the video data stream 110 to the H.264 format. The motion vector analysis module 102 is adapted for retrieving the motion vectors present in these metadata, and thus obtaining prediction information enabling obtaining predicted pictures, referred to as P pictures (unidirectional "forward" prediction by virtue of a preceding picture in the video data stream) and B pictures (bidirectional prediction by virtue of a preceding picture and a following picture in the video data stream). These P and B pictures are to be distinguished from the I pictures, also referred to as reference pictures, for which the macroblocks are all encoded in intra mode, optionally in a predicted manner.

The motion vector analysis module 102 is further adapted for obtaining the macroblock merging information 131 supplied by the macroblock merging module 101 and for determining resultant motion vectors associated with the macroblocks merged by the macroblock merging module 101. For the macroblocks merged by the macroblock merging module 101, the resultant motion vectors are a combination of the motion vectors associated with each of the macroblocks issuing from the video data stream 110 and which were merged.

The motion vector analysis module 102 is further adapted for performing a scaling of the motion vectors to the H.264 format so as to transpose them to the H.265 format. Indeed, the sub-pixel precision according to the H.264 format differs from the sub-pixel precision to the H.265 format, which involves a scaling in the context of transcoding. The motion vectors thus converted are then motion information 132 enabling, in the context of transcoding to the H.265 format, generating P and/or B pictures (inter-picture coding). Moreover, the P and B pictures consist of residuals, since the P and B pictures are predicted from I pictures (and optionally P and/or B pictures) and motion vectors associated with the macroblocks.

The transcoding device 100 further comprises an encoding module 103 adapted for generating a video data stream 120 to the H.265 format, from the macroblock merging information 131 supplied by the macroblock merging module 101 and from the motion information 132 supplied by the motion vector analysis module 102.

The behaviour of the transcoding device 100 is detailed hereinafter in relation to FIG. 4.

FIG. 2 schematically illustrates a second example 200 of a video data transcoding device according to the present invention. The transcoding device 200 has many similarities to the transcoding device 100 already presented in relation to FIG. 1.

The transcoding device 200 is adapted for receiving the video data stream 110 to the H.264 format.

The transcoding device 200 comprises a macroblock merging module 201 and said transcoding device 200 is adapted for injecting the video data stream 110 into said macroblock merging module 201. The macroblock merging module 201 is adapted for merging adjacent macroblocks according to a predetermined criterion of frequency similarity of the DCT coefficients of said macroblocks after application of an inverse quantisation operation, so as to form a data structure of the quadtree type. This quadtree corresponds to macroblock merging information 231 enabling, in the context of transcoding to the H.265 format, generating I pictures (intra-picture coding).

The transcoding device 200 further comprises a motion vector analysis module 202 and said transcoding device 200 is adapted for injecting, into said motion vector analysis module 202, metadata present in the video data stream 110 to the H.264 format. The motion vector analysis module 202 is adapted for retrieving the motion vectors present in these metadata. The motion vector analysis module 202 is further adapted for obtaining the macroblock merging information 231 supplied by the macroblock merging module 201 and for determining resultant motion vectors associated with the macroblocks merged by the macroblock merging module 201. For the macroblocks merged by the macroblock merging module 201, the resultant motion vectors are a combination of the motion vectors associated with each of the macroblocks issuing from the video data stream 110 and which were merged.

The motion vector analysis module 202 is further adapted for scaling the motion vectors to the H.264 format so as to transpose them to the H.265 format. The motion vectors thus converted correspond to motion information 232 enabling, in the context of transcoding to the H.265 format, generating P and/or B pictures (inter-picture coding).

The motion vector analysis module 202 is further adapted for supplying, to the macroblock merging module 201, a feedback 233 of analysis of the motion vectors, to enable the macroblock merging module 201 to refine the merging of the macroblocks.

The transcoding device 200 further comprises an encoding module 203 adapted for generating a video data stream 220 to the H.265 format, from the macroblock merging information 231 supplied by the macroblock merging module 201 and from the motion information 232 supplied by the motion vector analysis module 202.

The behaviour of the transcoding device 200 is detailed hereinafter in relation to FIG. 4.

FIG. 3 schematically illustrates an example of hardware architecture of a video data transcoding device 300 according to the present invention. The transcoding device 300 then comprises, connected by a communication bus 310: a processor or CPU (Central Processing Unit) 301; a Random Access Memory RAM 302; a Read-Only Memory ROM 303, a storage unit 304 or a storage medium reader, such as an SD (Secure Digital) card reader or a hard disk drive HDD; and a set of interfaces 305 for receiving a video data stream to the H.264 format and supplying a transcoded data stream to the H.265 format, for example via a communication network.

The processor 301 is capable of executing instructions loaded into the RAM 302 from the ROM 303, from an external memory (not shown), from a storage medium or from a communication network (not shown). When the transcoding device 300 is powered up, the processor 301 is capable of reading instructions from the RAM 302 and executing them. These instructions form a computer program causing the processor 301 to implement all or some of the algorithms and steps described hereinafter.

All or some of the algorithms and steps described hereinafter may thus be implemented in software form by execution of a set of instructions by a programmable machine, such as a DSP (Digital Signal Processor) or a microcontroller, or be implemented in hardware form by a machine or a dedicated component, such as an FPGA (Field-Programmable Gate Array) or an ASIC (Application-Specific Integrated Circuit). Each module shown in FIGS. 1 and 2 may thus correspond to a software implementation or to a hardware implementation. This means that only some of said modules may be implemented in software form while the rest of said modules may be implemented in hardware form.

FIG. 4 schematically illustrates a transcoding algorithm implemented by a video data transcoding device according to the present invention. Let us consider that the algorithm in FIG. 4 is implemented by the transcoding device 500.

In a step 401, the transcoding device 500 receives the video data stream 110 to the H.264 format.

In a following step 402, the transcoding device 500 merges adjacent macroblocks of reference I pictures issuing from the video data stream 110, in accordance with a predetermined criterion of frequency similarity of the DCT coefficients of said macroblocks after application of an inverse quantisation operation. The transcoding device 500 thus does not perform a complete decoding of the video data stream 110 to the H.264 format for performing the transcoding to the H.265 format.

To do this, the transcoding device 500 selects a reference picture (I picture) in a GOP (Group Of Pictures) sequence, considering that the video data stream 110 to the H.264 format is decomposed into GOP. The transcoding device 500 can reuse the definition of the GOP sequence defined in the context of the video data stream 110 to the H.264 format.

In a particular embodiment, the transcoding device 500 merges a plurality of successive GOP sequences as defined in the context of the video data stream 110 to the H.264 format. The resulting GOP thus a priori comprises a plurality of reference I pictures. The transcoding device 500 then replaces at least one I picture of this resulting GOP with a P picture or a B picture, so that there remains only one reference I picture in said GOP. The replacement of a reference I picture by a P picture or a B picture is done by performing corresponding prediction operations, so as to ensure data (video and metadata) consistency of the GOP.

More particularly, the transcoding device 500 merges a plurality of GOPs issuing from the video data stream 110 to the H.264 format when the reference I pictures of these GOPs are close. This aspect can be determined by the transcoding device 500 by comparing the energies of the B and P pictures. When the energies of the B and P pictures are below a third predefined threshold T, the transcoding device 500 merges the relevant GOPs; otherwise the transcoding device 500 keeps the definition of the GOPs used in the video data stream 110 to the H.264 format. This merging of GOPs enables obtaining a resultant GOP of larger size than the original, which enables reducing the transmission rate of the video data stream to the H.265 format, in particular in the presence of fixed pictures. The third predefined threshold T is for example defined following a learning phase or laboratory tests.

The transcoding device 500 determines, for each macroblock of each picture of the GOP, information on frequency similarity with each macroblock adjacent to said macroblock.

According to a particular embodiment, the information on frequency similarity S of a macroblock centred at $(i, j)$ with respect to a macroblock centred at $(k, l)$ is determined thanks to a sum of absolute differences (SAD) algorithm applied to the DCT coefficients after inverse quantisation. The frequency similarity information S is then the result of the SAD algorithm applied to the DCT coefficients after inverse quantisation.

The transcoding device 500 then compares the frequency-similarity information S thus determined with a first predefined threshold $S_0$. Said first predefined threshold $S_0$ is for example defined following a learning phase or laboratory tests.

If the frequency-similarity information S is below said first predefined threshold $S_0$, then the transcoding device 500 considers that the concerned macroblocks can be merged; otherwise the transcoding device 500 considers that the concerned macroblocks do not have sufficient similarities to be merged. The transcoding device 500 reiterates the operation for each pair of adjacent macroblocks. The merging operations actually performed must comply with the authorised sizes of the CTUs, as defined by the H.265 format.

The merging of the macroblocks may be performed by using a set of three butterfly diagrams. This approach enables merging square macroblocks (e.g. of size 4×4 or 8×8) into square macroblocks of greater size (e.g. of size 16×16 or 32×32).

FIG. 5 schematically illustrates an example of merging of four adjacent macroblocks 501, 502, 503, 504 of the video data stream to the H.264 format so as to form a macroblock 509 of the video data stream to the H.265 format. The macroblocks 501, 502, 503, 504 are spatially positioned as shown in FIG. 5. The macroblocks 501, 502, 503, 504 are, illustratively, of size 2×2 (although this size is not compatible with the H.264 format, this allows a simple illustration of the merging mechanism). The merging of these macroblocks 501, 502, 503, 504 then leads to a macroblock of size 8×8.

Let us consider that the macroblock 501 comprises a set of DCT coefficients after inverse quantisation, referenced A1, B1, C1, D1, as shown in FIG. 5. Let us consider also that the macroblock 802 comprises a set of DCT coefficients after inverse quantisation, referenced A2, B2, C2, D2, as shown in FIG. 5. Let us consider also that the macroblock 503 comprises a set of DCT coefficients after inverse quantisation, referenced A3, B3, C3, D3, as shown in FIG. 5. Let us consider also that the macroblock 504 comprises a set of DCT coefficients after inverse quantisation, referenced A4, B4, C4, D4, as shown in FIG. 5.

A first butterfly diagram enables making a first merging along the vertical dimension of the macroblocks 501 and 502. A second butterfly diagram enables making a second merging along the vertical dimension of the macroblocks 503 and 504. In this way four intermediate macroblocks 505, 506, 507 and 508 are obtained. Let us consider that the macroblock 505 consists of a set of merged DCT coefficients referenced E1, F1, G1, H1, as shown in FIG. 5. Let us consider also that the macroblock 506 consists of a set of merged DCT coefficients referenced E2, F2, G2, H2, as shown in FIG. 5. Let us consider also that the macroblock 507 consists of a set of merged DCT coefficients referenced E3, F3, G3, H3, as shown in FIG. 5. Let us consider also that the macroblock 508 consists of a set of merged DCT coefficients referenced E4, F4, G4, H4, as shown in FIG. 5. The merging of the macroblocks 501, 502, 503 and 504 is then such that:

| | | | |
|---|---|---|---|
| E1 = A1 + A2 | E2 = A1 − A2 | E3 = A3 + A4 | E4 = A3 − A4 |
| F1 = B1 + B2 | F2 = B1 − B2 | F3 = B3 + B4 | F4 = B3 − B4 |
| G1 = C1 + C2 | G2 = C1 − C2 | G3 = C3 + C4 | G4 = C3 − C4 |
| H1 = D1 + D2 | H2 = D1 − D2 | H3 = D3 + D4 | H4 = D3 − D4 |

A third butterfly diagram enables making a third merging, along the horizontal dimension, of the intermediate macroblocks 505, 506, 507 and 508 so as to obtain the macroblock 509. Let us consider that the macroblock 509 consists of a set of merged DCT coefficients referenced P1, P2, P3, P4, Q1, Q2, Q3, Q4, R1, R2, R3, R4, S1, S2, S3, S4 as shown in FIG. 5. The merging of the intermediate macroblocks 505, 506, 507 and 508 is then such that:

| | | | |
|---|---|---|---|
| P1 = E1 + E3 | P2 = F1 + F3 | P3 = E1 − E3 | P4 = F1 − F3 |
| Q1 = G1 + G3 | Q2 = H1 + H3 | Q3 = G1 − G3 | Q4 = H1 − H3 |
| R1 = E2 + E4 | R2 = F2 + F4 | R3 = E2 − E4 | R4 = F2 − F4 |
| S1 = G2 + G4 | S2 = H2 + H4 | S3 = G2 − G4 | S4 = H2 − H4 |

Returning to FIG. 4, the transcoding device 500 then performs an operation of quantisation of the DCT macroblocks, after execution of the merging operation, using a quantisation step less than or equal to the quantisation step that had been used to generate the data stream to the H.264 format. Quantisation step information is provided in the metadata included in the data stream to the H.264 format.

According to a particular embodiment, the transcoding device 500 does not perform any merging of macroblocks when at least one of these macroblocks is encoded in intra mode while the rest of the macroblocks in question are encoded in inter mode. Indeed, P and B pictures may contain one or more macroblocks encoded in intra mode.

When the merged macroblocks correspond to predicted data in intra mode, the transcoding device 500 associates with the resultant macroblock a prediction direction that is the prediction direction closest, according to the H.264 format, to a linear combination of the prediction directions associated with the merged macroblocks.

In a following step 403, the transcoding device 500 generates a data structure of the quadtree type from the macroblocks obtained after the merging and quantisation operation of the step 402.

Next, in a step 404, the transcoding device 500 obtains motion vectors from the video data stream 110.

In a following step 405, the transcoding device 500 evaluates the difference between the motion vectors associated with the macroblocks issuing from the video data stream 110 and which have been merged together. The transcoding device 500 seeks to determine information on similarity of motion between said motion vectors. To do this, the transcoding device 500 may determine the norm of the difference between the components of said motion vectors. Each component of a first motion vector is subtracted from the corresponding component of a second motion vector, and the resulting norm is calculated. This norm is then compared with a second predefined threshold $S_1$. Said second predefined threshold $S_1$ is for example defined following a learning phase or laboratory test. If the motion similarity information is below said second predefined threshold $S_1$, then the transcoding device 500 considers that the macroblocks concerned can actually be merged; otherwise the transcoding device 500 considers that the macroblocks concerned do not have sufficient similarities to be merged. If all the merging operations are confirmed, then a step 406 is performed; otherwise the step 402 is reiterated, preventing the merging or merging operations invalidated by the step 405.

When the algorithm in FIG. 4 represents the behaviour of the transcoding device 100 already described in relation to FIG. 1, the step 405 is omitted and the algorithm passes directly from the step 404 to the step 406. The merging of the macroblocks performed by the macroblock merging module 101 is then kept. When the algorithm in FIG. 4 represents the behaviour of the transcoding device 200 already described in relation to FIG. 2, the step 405 is executed, which enables the motion vector analysis module 202 to call into question the merging of the macroblocks proposed by the macroblock merging module 201.

In the step 406, for each of the macroblocks encoded in inter mode resulting from a merging of macroblocks, the transcoding device 500 determines a combination of the motion vectors associated with each of the macroblocks issuing from the video data stream 110 and which have been merged.

According to a first example, such a combination is the median of the motion vectors of said macroblocks issuing from the video data stream 110 and which have been merged. For the macroblocks that have not been subject of a merging, the transcoding device 500 takes the motion vector as present in the video data stream 110 to the H.264 format.

According to a second example, such a combination is defined by the following equation:

$$MV = \frac{(\alpha 1 \cdot MV1 + \alpha 2 \cdot MV2 + \ldots \alpha n \cdot MVn)}{(\alpha 1 + \alpha 2 \ldots + \alpha n)}$$

where:
MV designates the smoothed motion vector,
n designates the quantity of merged macroblocks;
MV1, . . . , MVn represents the n motion vectors of the macroblocks coded in inter mode that were merged together at the step 402; and
α1, . . . , αn are weighting coefficients.

The weighting coefficients α1, . . . , αn are for example defined following a learning phase or laboratory tests.

The transcoding device 500 preferentially ensures that the weighting coefficients α1, . . . , αn are such that a weighting coefficient associated with a motion vector pointing to an I picture is higher than a weighting coefficient associated with a motion vector pointing to a P or B picture.

In the case of B pictures, for a considered macroblock, the prediction may be "forward" or "backward". The motion vectors have reference frames in opposite directions. The transcoding device 500 then reverses any motion vector defined according to a backward prediction, before performing the combination of motion vectors of the step 406.

Next the transcoding device 500 scales the motion vectors to the H.264 format so as to transpose them to the H.265 format.

In a following step 407, the transcoding device 500 generates a data stream to the H.265 format on the basis of the quadtree generated at the step 403 and the motion vectors scaled at the step 406.

The invention claimed is:

1. A transcoding method for transcoding a video data stream in the H.264 format into a video data stream in the H.265 format, said method being implemented by a transcoding device comprising electronic circuitry adapted to execute the method, wherein said method comprises:
receiving the data stream in the H.264 format;
generating merged macroblocks by merging adjacent macroblocks issuing from the data stream in the H.264 format when a predetermined criterion of frequency similarity of the discrete cosine transform (DCT) coefficients of said adjacent macroblocks occurs after application of an inverse quantisation operation, the merging being performed in the DCT domain;
determining new motion vectors in the H.265 format on the basis of motion vectors issuing from the data stream in H.264 format by performing, for the merged macroblocks, a combination of the motion vectors of said adjacent macroblocks issuing from the data stream in the H.264 format; and
generating the data stream in the H.265 format on the basis of the merged macroblocks and the new motion vectors;
wherein, for merging four of the adjacent macroblocks so as to form a resultant square macroblock, the transcoding device implements:
a first butterfly diagram applied on the DCT coefficients after inverse quantization of two first adjacent macroblocks along the vertical dimension, thus enabling generating two first intermediate macroblocks from the two first of the adjacent macroblocks in the four adjacent macroblocks;
a second butterfly diagram applied on the DCT coefficients after inverse quantization of two other adjacent macroblocks along the vertical dimension, thus enabling generating two second intermediate macroblocks from the other two of the adjacent macroblocks in the four adjacent macroblocks; and
a third butterfly diagram applied on merged DCT coefficients of the intermediate macroblocks along the horizontal dimension, thus enabling generating the resultant square macroblock.

2. The transcoding method according to claim 1, wherein, when the merged macroblocks of the data stream in the H.264 format are encoded in intra mode, each of the merged macroblocks that are encoded in intra mode are associated with a prediction direction, and the transcoding device associates, with the merged macroblocks, a prediction direction that is the prediction direction closest, according to the H.264 format, to a linear combination of the prediction directions associated with the merged macroblocks.

3. The transcoding method according to claim 1, wherein, the predetermined criterion is when an information representative of the sum of the absolute differences between DCT coefficients, after inverse quantisation, of said adjacent macroblocks is below a first predefined threshold.

4. The transcoding method according to claim 1 wherein, for the adjacent macroblocks encoded in inter mode to be merged, the transcoding device determines a difference between the motion vectors associated with said adjacent macroblocks, and enables the merging of said adjacent macroblocks when a value representative of a difference between the motion vectors of the adjacent macroblocks is below a second threshold.

5. The transcoding method according to claim 4, wherein, for determining whether the motion vectors of the adjacent macroblocks are similar, the transcoding device determines the norm of the difference of the components of the motion vectors of the adjacent macroblocks and compares said norm with a second predefined threshold.

6. The transcoding method according to claim 1, wherein the transcoding device determines each of the new motion vectors MV in the H.265 format resulting from a merging of macroblocks encoded in inter mode using the following equation:

$$MV = \frac{(\alpha1 \cdot MV1 + \alpha2 \cdot MV2 + \ldots \alpha n \cdot MVn)}{(\alpha1 + \alpha2 \ldots + \alpha n)}$$

where:
n designates the quantity of merged macroblocks;
MV1, . . . , MVn represents the n motion vectors of the macroblocks encoded in inter mode that were merged together; and
$\alpha1, \ldots, \alpha n$ are weighting coefficients.

7. A transcoding device for transcoding a video data stream in the H.264 format into a video data stream in the H.265 format, wherein said transcoding device comprises electronic circuitry adapted for:
receiving the data stream in the H.264 format;
generating merged macroblocks by merging adjacent macroblocks issued from the data stream in the H.264 format when a predetermined criterion of frequency similarity of the discrete cosine transform (DCT) coefficients of said macroblocks occurs after application of an inverse quantisation operation, the merging being performed in the DCT domain;
determining new motion vectors in the H.265 format on the basis of motion vectors issuing from the data stream in the H.264 format by performing, for the merged macroblocks, a combination of the motion vectors of said adjacent macroblocks issuing from the data stream in the H.264 format; and
generating the data stream in the H.265 format on the basis of the merged macroblocks and of the new motion vectors;
wherein, for merging four of the adjacent macroblocks so as to form a resultant square macroblock, the transcoding device implements:
a first butterfly diagram applied on the DCT coefficients after inverse quantization of two first adjacent macroblocks along the vertical dimension, thus enabling generating two first intermediate macroblocks from the two first of the adjacent macroblocks in the four adjacent macroblocks;
a second butterfly diagram applied on the DCT coefficients after inverse quantization of two other adjacent macroblocks along the vertical dimension, thus enabling generating two second intermediate macroblocks from the other two of the adjacent macroblocks in the four adjacent macroblocks; and
a third butterfly diagram applied on merged DCT coefficients of the intermediate macroblocks along the horizontal dimension, thus enabling generating the resultant square macroblock.

8. A non transitory information storage medium storing a computer program comprising program code instructions which can be loaded in a programmable device to cause said programmable device to implement the method according to claim 1, when the program code instructions are run by the programmable device.

9. A transcoding method for transcoding a video data stream in the H.264 format into a video data stream in the H.265 format, said method being implemented by a transcoding device comprising electronic circuitry adapted to execute the method, wherein said method comprises:
receiving the data stream in the H.264 format;
generating merged macroblocks by merging adjacent macroblocks issuing from the data stream in the H.264 format when a predetermined criterion of frequency similarity of the discrete cosine transform (DCT) coefficients of said adjacent macroblocks occurs after application of an inverse quantisation operation, the merging being performed in the DCT domain, wherein the predetermined criterion is when an information representative of the sum of the absolute differences between DCT coefficients, after inverse quantisation, of said adjacent macroblocks is below a first predefined threshold;
determining new motion vectors in the H.265 format on the basis of motion vectors issuing from the data stream in H.264 format by performing, for the merged macroblocks, a combination of the motion vectors of said adjacent macroblocks issuing from the data stream in the H.264 format; and
generating the data stream in the H.265 format on the basis of the merged macroblocks and the new motion vectors.

10. The transcoding method according to claim 9, wherein, when the merged macroblocks of the data stream in the H.264 format are encoded in intra mode, each of the merged macroblocks that are encoded in intra mode are associated with a prediction direction, and the transcoding device associates, with the merged macroblocks, a prediction direction that is the prediction direction closest, according to the H.264 format, to a linear combination of the prediction directions associated with the merged macroblocks.

11. The transcoding method according to claim 9, wherein, for merging four of the adjacent macroblocks so as to form a resultant square macroblock, the transcoding device implements:
a first butterfly diagram along the vertical dimension of the adjacent macroblocks, thus enabling generating two first intermediate macroblocks from two of the macroblocks in the four adjacent macroblocks;
a second butterfly diagram along the vertical dimension of the adjacent macroblocks thus enabling generating two second intermediate macroblocks from the other two of the adjacent macroblocks in the four adjacent macroblocks; and
a third butterfly diagram along the horizontal dimension of the adjacent macroblocks, thus enabling generating the resultant square macroblock.

12. The transcoding method according to claim 9 wherein, for the adjacent macroblocks encoded in inter mode to be merged, the transcoding device determines a difference between the motion vectors associated with said adjacent macroblocks, and enables the merging of said adjacent macroblocks when a value representative of a difference between the motion vectors of the adjacent macroblocks is below a second threshold.

13. The transcoding method according to claim 12, wherein, for determining whether the motion vectors of the adjacent macroblocks are similar, the transcoding device determines the norm of the difference of the components of the motion vectors of the adjacent macroblocks and compares said norm with a second predefined threshold.

14. The transcoding method according to claim 9, wherein the transcoding device determines each of the new motion vectors MV in the H.265 format resulting from a merging of macroblocks encoded in inter mode using the following equation:

$$MV = \frac{(\alpha 1 \cdot MV1 + \alpha 2 \cdot MV2 + \ldots \alpha n \cdot MVn)}{(\alpha 1 + \alpha 2 \ldots + \alpha n)}$$

where:
- n designates the quantity of merged macroblocks;
- $MV1, \ldots, MVn$ represents the n motion vectors of the macroblocks encoded in inter mode that were merged together; and
- $\alpha 1, \ldots, \alpha n$ are weighting coefficients.

15. A non transitory information storage medium storing a computer program comprising program code instructions which can be loaded in a programmable device to cause said programmable device to implement the method according to claim 9, when the program code instructions are run by the programmable device.

16. A transcoding device for transcoding a video data stream in the H.264 format into a video data stream in the H.265 format, wherein said transcoding device comprises electronic circuitry adapted for:

receiving the data stream in the H.264 format;

generating merged macroblocks by merging adjacent macroblocks issued from the data stream in the H.264 format when a predetermined criterion of frequency similarity of the discrete cosine transform (DCT) coefficients of said macroblocks occurs after application of an inverse quantisation operation, the merging being performed in the DCT domain, wherein the predetermined criterion is when an information representative of the sum of the absolute differences between DCT coefficients, after inverse quantisation, of said adjacent macroblocks is below a first predefined threshold;

determining new motion vectors in the H.265 format on the basis of motion vectors issuing from the data stream in the H.264 format by performing, for the merged macroblocks, a combination of the motion vectors of said adjacent macroblocks issuing from the data stream in the H.264 format; and generating the data stream in the H.265 format on the basis of the merged macroblocks and of the new motion vectors.

* * * * *